No. 812,761. PATENTED FEB. 13, 1906.
J. W. MEIER.
ROACH TRAP.
APPLICATION FILED JULY 12, 1905.
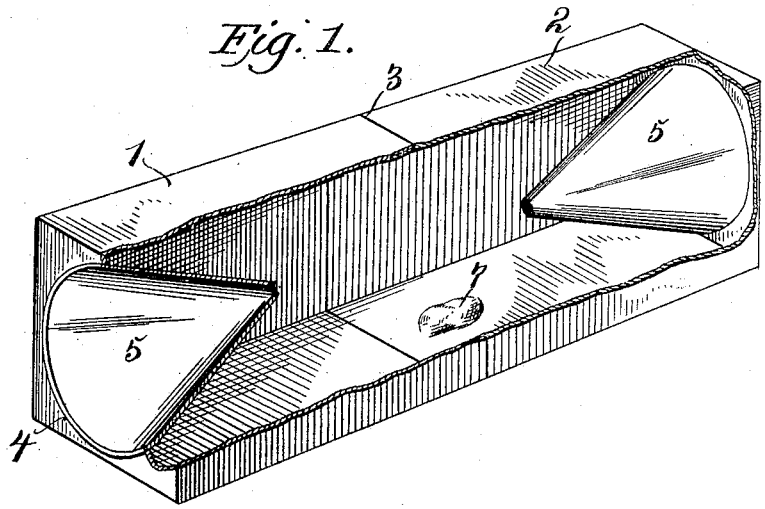
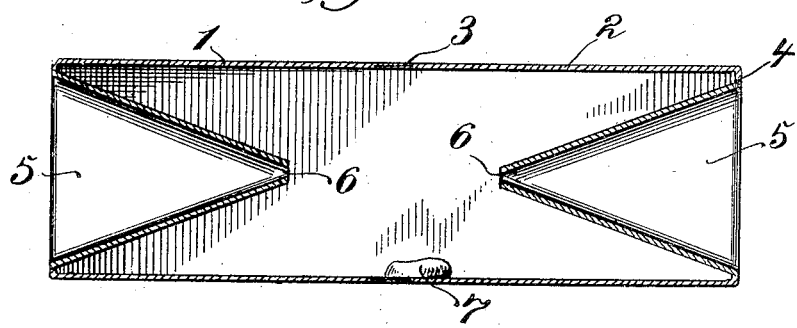
WITNESSES: INVENTOR:
James F. Duhamel Julius W. Meier,
W. H. Clarke By his Attorney
Victor J. Evans.

UNITED STATES PATENT OFFICE.

JULIUS W. MEIER, OF NEW YORK, N. Y.

ROACH-TRAP.

No. 812,761.  Specification of Letters Patent.  Patented Feb. 13, 1906.

Application filed July 12, 1905. Serial No. 269,353.

*To all whom it may concern:*

Be it known that I, JULIUS W. MEIER, a citizen of the United States, residing at 9 William street, New York city, in the county of New York and State of New York, have invented new and useful Improvements in Roach-Traps, of which the following is a specification.

This invention relates to roach-traps.

The objects of the invention are to improve and simplify the construction of such devices; furthermore, to decrease the expense attending their manufacture.

With the foregoing and other objects in view, which will appear as the description proceeds, the invention resides in the combination and arrangement of parts and in the details of construction hereinafter described and claimed as a practical embodiment thereof.

In the accompanying drawings, forming part of this specification, Figure 1 is a perspective view, partly broken away, of a roach-trap constructed in accordance with the invention. Fig. 2 is a vertical longitudinal section thereof.

Like reference-numerals indicate corresponding parts in the two figures of the drawings.

The improved roach-trap consists of two sections 1 and 2, which are constructed of pasteboard or other suitable material. The section 1 is cut away interiorly, and the section 2 is cut away exteriorly to form an overlapping joint, as indicated at 3, so that the two sections may be readily joined together or separated from each other. It will be observed from Fig. 1 that each of the sections 1 and 2 is approximately rectangular in shape and is formed with a closed end, as indicated at 4. Formed in the closed end 4 of each section is a circular opening, into which is fitted a funnel-shaped entrance-chute 5, having the inner end 6 thereof formed with a small opening to permit the entrance of insects.

Constructed as above described the improved trap is used in the following manner: The two sections of the trap are drawn apart and a piece of bait 7 is inserted, after which the sections are fitted together. The insects upon detecting the presence of the bait by its odor pass up the entrance-chute 5 and fall into the trap. When it is desired to empty the trap, the two sections are readily drawn apart.

It will be apparent from the foregoing description that the improved trap of this invention is strong, simple, durable, and inexpensive in construction, as well as thoroughly efficient in operation. By reason of the fact that the trap is rectangularly shaped it can be placed on any one of its sides without danger of rolling away or becoming misplaced, as in the case of a cylindrical trap. By cutting away the interior of one section and the exterior of the other section an overlapping joint of simple and effective construction is formed. Furthermore, the two sections are flush with each other on all sides of the trap.

In its particular combination and arrangement of parts and in its exact details of construction the roach-trap of this invention constitutes an improvement over prior devices intended for a similar purpose.

Having thus described the invention, what is claimed as new is—

A roach-trap comprising two rectangular sections, one of said sections being cut away interiorly and the other of said sections being cut away exteriorly to form a flush overlapping joint, each of said sections having a closed end formed with a circular opening, and a funnel-shaped entrance-chute fitted into said opening.

In testimony whereof I have affixed my signature in presence of two witnesses.

JULIUS W. MEIER.

Witnesses:
  W. H. CLARKE,
  H. G. HOSE.